United States Patent [19]

Worcester et al.

[11] Patent Number: 4,816,215
[45] Date of Patent: Mar. 28, 1989

[54] ULTRAPURE ZIRCONIUM-TIN LINER MATERIAL

[75] Inventors: Samuel A. Worcester; Charles R. Woods, both of Ogden, Utah

[73] Assignee: Westinghouse Electric Corp., Pittsburgh, Pa.

[21] Appl. No.: 111,231

[22] Filed: Oct. 22, 1987

[51] Int. Cl.$^4$ .................................................. G21C 3/00
[52] U.S. Cl. ..................................... 376/416; 420/422
[58] Field of Search ......................... 376/416; 420/422

[56] References Cited

U.S. PATENT DOCUMENTS 4,610,842  9/1986  Vannesjo .............................. 376/416
4,664,881  5/1987  Ferrari ................................. 376/410
4,675,153  6/1987  Boyle .................................. 376/416

Primary Examiner—Donald P. Walsh
Attorney, Agent, or Firm—R. A. Stoltz

[57] ABSTRACT

This is a material for lining reactor fuel element cladding. Rather than using unalloyed zirconium, this invention utilized for a 0.1-4% tin alloy liner for the cladding. The very low metallic impurities to reduce solid solution strengthening and second phase formation and property variability from lot to lot, while using alloying to reduce the susceptibility to steam corrosion. Preferably, oxygen is controlled to a very low level as well, to provide a low, but fabricable, hardness in the alloyed liner material.

9 Claims, No Drawings

ULTRAPURE ZIRCONIUM-TIN LINER MATERIAL

CROSS-REFERENCE TO RELATED APPLICATIONS

Application Ser. No. 780,392, filed Sept. 26, 1985, describes a process for producing zirconium or hafnium utilizing a precharge of molten salt during reduction of zirconium tetrachloride to metal. The process uses a combination reduction-distillation vessel. The precharge of salt prevents reduction of metal outside the liner, facilitating removal of the liner after the reduction-distillation is completed. Copending application Ser. No. 780,343, filed Sept. 26, 1985, describes a high purity material having 500–1000 ppm of total impurities. Such material might be produced, for example, by the aforementioned process in Ser. No. 780,392 in a combined reduction-distillation vessel.

A related process is described in copending application Ser. No. 871,182, filed June 5, 1986. That related application also produces high purity material, utilizing an electron beam melting step following prebaking of the material and produces a low iron (50–300 ppm) low oxygen (250–350 ppm) for use as a liner material for reactor fuel element cladding.

A related process is described in copending application Ser. No. 871,183, filed June 5, 1986, which also produces high purity material for the same uses as the preceding copending application and also uses essentially the same electron beam melting step (broadly at 1–20, but typically at about 4–16 inches per hour), but rather than requiring prebaking, utilizes a vacuum arc melting step after the EB melting to homogenize the material.

A related process is described in copending application No. 030,007, filed Mar. 23, 1987, which produces zirconium with a low iron content, that application utilizes a modified, somewhat lower temperature distillation step (the distillation step, which is after reduction, but prior to melting, removes magnesium chloride and magnesium from the zirconium sponge produced by the reduction).

A method for the reduction of the oxygen content in magnesium (which low oxygen content magnesium may in be used in producing low oxygen zirconium), is described in copending application Ser. No. 017,301, filed Feb. 20, 1987. In that application, magnesium, in a molten state is contacted by a solid particulate metal such as zirconium or titanium. When the molten magnesium is separated from the particulate metal, the oxygen content of the magnesium metal has been substantially reduced. In addition, nickel, iron, chromium, and aluminum content of the magnesium may also be reduced.

The following copending applications describe various zirconium alloys; Ser. No. 057,715, filed June 1, 1987 as a continuation of now abandoned Ser. No. 709,852, which was filed Mar. 8, 1985 (typically containing, in weight percent 0.1–0.3% Sn, 0.05–0.40% Nb, 0.05–0.20% Fe, 300–1200 ppm oxygen, 0.03–0.1% Ni plus Cr, less than 0.25% Fe plus Cr, with the balance essentially Zr); Ser. No. 589,300, filed Mar. 14, 1984 (typically containing 0.1–0.6% Sn, 0.07–0.24% Fe, 0.05–0.15% Cr, less than 0.05% Ni, with the balance essentially Zr); Ser. No. 709,865, filed Mar. 8, 1985 (typically containing 0.19–0.60% Sn, 0.19–0.50% Fe, 0–.3% Ni, 100–700 ppm oxygen, with the balance essentially Zr); and Ser. No. 071,588, filed Mar. 8, 1987 (typically containing 0.4–0.6% Sn, 0.5–1.4% Fe, 100–700 ppm oxygen, with the balance essentially Zr).

Copending application Ser. No. 113,841 filed 10/28/87 provides a process for EB melting followed by vacuum arc melting with at least one alloying additive to make a zirconium alloy for lining of reactor cladding.

Copending application Ser. No. 111,230 filed 10/22/87 provides an ultra-slow EB melting for liner material. The ultra-slow melting of that copending application can be used in conjunction with this invention.

The preceding applications are all assigned to the same assignee and are all hereby incorporated by reference.

BACKGROUND OF THE INVENTION

Field of the Invention

This invention relates to zirconium and zirconium alloys, and in particular relates a purified zirconium for use in liner for reactor cladding.

Description of the Related Art

In the commercial production of zirconium and hafnium metal, the ore is generally initially subjected to a chlorination step which produces a relatively impure, hafnium containing, zirconium tetrachloride and by-product silicon tetrachloride (which by-product is relatively easily separated). The zirconium and hafnium containing material is then subjected to a number of purifying operations and also a complex hafnium separation operation. These operations result in purified oxides of zirconium and hafnium which, of course, are thereafter maintained separate. The purified oxides are then separately chlorinated. Zirconium and hafnium are reduced from the chloride by means of a reducing metal (generally magnesium). Excess reducing metal and by-product salt, (e.g. magnesium and magnesium chloride) are removed from the so-called zirconium "sponge" by a distillation step. The zirconium metal is then generally double or triple vacuum arc melted to produce an ingot, which is then further processed (e.g. into Zircaloy tubing for reactor fuel element cladding).

Ultrapure ("crystal-bar") zirconium has been proposed for a liner for the inside surface of Zircaloy tubing for use as a cladding for reactor fuel, as described in, for example, U.S. Pat. No. 4,372,871 to Armijo et al. on Feb. 8, 1983. A similar use, but with moderate purity material, is proposed in U.S. Pat. No. 4,200,492 to Armijo et al. on Apr. 29, 1980.

Ultrapure zirconium has been produced in iodide cells by the so-called "crystal bar" process, (a very expensive process which produces a very soft, 90 Brinell product) as discussed, for example, in U.S. Pat. No. 4,368,072 issued to Siddall on Jan. 11, 1983. Material for lining cladding for reactor fuel elements by electron beam (EB) melting is disclosed in Japanese Patent Application No. 1979-144,789 by Kawakita et al., published June 8, 1981. That application discloses utilizing electron beam melting as the final melting, in a quite small laboratory (rather than commercial EB furnace).

Commercial reactors generally use either Zircaloy-2 or Zircaloy-4. The history of the development of Zircaloy-2 and Zircaloy-4 is summarized in: Kass, "The Development of the Zircaloys", ASTM Special Technical Publication No. 368 (1964), pages 3–27. Also of interest with respect to Zircaloy development are U.S. Pat. Nos. 2,772,964; 3,097,094; and 3,148,055. Zircaloy-2 is a zirconium alloy having about 1.2–1.7 weight percent (all percentages herein are weight percent) tin, 0.07–0.20 percent iron, about 0.05–0.15 percent chromium, and about 0.03–0.08 percent nickel. Zircaloy-4 generally contains about 1.2–1.7 percent tin, about 0.18–0.24 percent iron, and about 0.07–0.13 percent chromium.

U.S. Pat. No. 4,675,153 is a zirconium alloy having generally somewhat less alloying agent content (typically 0.2–0.6 Sn, 0.03–0.11 Fe, less than 0.02 Cr, less than 350 ppm oxygen, with the balance essentially Zr) and U.S. Pat. No. 4,613,479 is an example of a niobium zirconium alloy with less than 59% Zr (these two U.S. patents are hereby incorporated by reference).

EB (electron beam) melting of materials, including zirconium, has been discussed in a number of patents. EB melting has been used to consolidate crushed particles or chips in so-called hearth furnaces and to separate impurities by either overflowing floating inclusions (4,190,404 to Drs et al. on Feb. 26, 1980) or to produce an electrode for arc melting (4,108,644 to Walberg et al. on Aug. 22, 1978). A number of U.S. patents have used EB melting of powders or granules, often producing an ingot in a chilled mold. These powder melting EB patents include 2,942,098 to Smith on June 21, 1960; 2,960,331 to Hanks on Nov. 15, 1960; 2,963,530 to Hanks et al. on Dec. 6, 1960; 2,997,760 to Hanks et al. on Aug. 29, 1961; 2,935,395 to Smith on May 3, 1960; and 4,482,376 to Tarasescu et al. on Nov. 13, 1984. Electron beam zone refining using multiple passes is described in U.S. Pat. No. 3,615,345 to King on Oct. 26, 1971.

EB melting using a consumable feed "electrode" to produce an ingot collected in a chilled mold has also been discussed in a number of patents, including 3,087,211 to Howe on Apr. 30, 1963; 3,226,223 to Bussard et al. on Dec. 28, 1965; 2,880,483 to Hanks et al. on Apr. 7, 1959; and 4,130,416 to Zaboronok et al. on Dec. 19, 1978. U.S. Pat. No. 3,219,435 to Gruber et al. on Nov. 23, 1965 shows a commercial type EB furnace utilizing multiple beams. Typically the beams are directed to the surface of the molten pool and are continually swept across the pool surface to avoid overheating of any single portion of the pool surface. U.S. Pat. No. 3,091,525 to D'A. Hunt on May 28, 1963 describes adding a small amount of zirconium, for example, to hafnium, for example and melting in an EB furnace to deoxidize the hafnium.

SUMMARY OF THE INVENTION

This is a alloyed material for lining of reactor fuel element cladding. This invention provides for significant reduction of metallic impurity content and gives a more consistent product due to reduced solid solution strengthening and second phase formation. The alloyed liner has better corrosion resistance than unalloyed zirconium, but generally has the ductility of the commonly used unalloyed liner material. In addition, this material, being strengthened by tin, instead of oxygen, is believed to be more crack propagation resistant than unalloyed material of the same hardness, especially under irradiation.

The product can be produced by a process utilizing electron beam melting of sponge zirconium, at a very slow feed rate, to reduce metallic impurities (especially aluminum and iron). The electron beam melted zirconium is then alloyed in a vacuum arc furnace by means of an alloying charge. The alloying charge provides 0.1–0.4 weight percent tin. The liner material contains less than 400 (preferably less than 300 and most preferable less than 175) ppm of oxygen and less than 100 ppm and preferably less than 50 ppm of iron, and less than 100 ppm total of other metallic and metalloid impurities.

Thus, this material provides an ultrapure alloy of tin and zirconium which provides a ductile, but reliably fabricatible liner material having somewhat better corrosion resistance than unalloyed zirconium. It is believed to give better crack propogation resistance under irradiation at a reliably fabricatible hardness than any other material.

DESCRIPTION OF THE PREFERRED EMBODIMENT

This invention provides a liner material for Zircaloy reactor fuel cladding similar to the lined cladding described in the aforementioned U.S. Pat. Nos. 4,372,817 and 4,200,492, except the liner material, rather than being pure or ultrapure zirconium, is, in the invention hereindescribed, a zirconium alloy.

While so-called crystal bar material has been proposed for lining of fuel element cladding, such material is generally too expensive for commercial use and too soft for reliable production, and so-called "sponge" zirconium has generally been used for such lined cladding. The sponge material is typically selected from the lower oxygen containing batches of normal zirconium production, and generally contains 500–600 ppm of oxygen. Such material is referred to as "sponge" or "selected sponge" as there is practically no purification of the metal after reduction (the distillation and vacuum melting are generally viewed as the separation of magnesium chloride by-product and excess magnesium left over from reduction, rather than as purification, and the only other thing removed in the double or triple vacuum melting is a very small amount of manganese). Thus the purity of the metal in the final product in such material is generally the same as the purity of the metal in the sponge configuration produced by reduction (the reduction product, although metallic, has a sponge-like appearance).

Recently, so-called "EB" material has been used to line cladding (as noted in the aforementioned copending applications Ser. Nos. 871,182 and 871,183). This EB material has been significantly further purified by melting in an electron beam furnace at about 4–16 inches per hour, generally to reduce the iron content. Typically, the iron content of sponge is in the 500–800 ppm range, and EB melting in one or two passes at such speeds is utilized to lower the iron content to the 200–300 ppm range.

In addition to crystal bar, sponge, and EB melted zirconium, it has also been proposed that zirconium alloyed with 0.5–1.5 percent tin be utilized for liner material. A zirconium alloy liner is also described in the aforementioned U.S. Pat. No. 4,675,153, which alloy contains about 0.2–0.6 weight percent tin, about 0.03–0.11 percent iron, and up to about 350 ppm oxygen.

In particular, typical sponge has an aluminum content of 40–50 ppm (the ASTM Spec B349-80, cited in that patent prescribes a 75 ppm maximum). The process of the aforementioned copending application Ser. No. 113,841 can give aluminum of less than 5 ppm (experimental runs produced zirconium containing less than 2 ppm of aluminum). In addition, that process will reduce the chromium content from typically about 100 ppm (the aforementioned specification calls for 200 ppm chromium max) to less than 10 ppm chromium (typical measured numbers were about 5 ppm chromium). While chromium, unlike aluminum, is not generally considered detrimental in many alloys, reducing the chromium reduces lot-to-lot property variability due to second phase formation. Silicon is reduced to less than 10 ppm, also reducing second phase formation. The aluminum reduction reduces solid solution strengthening. The reduced aluminum is combined with low oxygen content, as produced, for example, by the aforementioned copending application Ser. Nos. 871,182 and/or 017,301 or by the ultra-slow EB melting or combinations thereof, such that the hardening produced by the alloying agents is generally compensated by the softening effect of the lesser oxygen and lesser aluminum. This provides a material which is soft and ductile enough to substantially impede crack propagation (generally less than 125 Brinell) while being hard enough for reliable fabrication (generally at least about 105 Brinell) and having corrosion properties somewhat superior to non-alloyed zirconium.

The ultra-slow EB melting provides some oxygen removal (as well as generally removing aluminum, iron, chromium and other metallic impurities). The oxygen removal in a commercial EB furnace is very surprising as, although previously reported in a very small laboratory furnace, there had previously been no indication of any oxygen reduction in a commercial EB furnace.

The so-called "pellet-cladding-interaction" has caused crack initiation on the inside surface of cladding, and the zirconium lined cladding of the prior art greatly reduces such cracking. The alloys of this invention give as good or better resistance to crack propagation combined with somewhat improved (as compared to unalloyed zirconium) resistance to steam corrosion. In particular, this material has a very low metallic impurity content (especially aluminum and iron), combined with very low oxygen content. Metalloids, such as phosphorous and silicon are also reduced.

For example, this material can be made by reducing zirconium tetrachloride to metallic zirconium utilizing low oxygen magnesium (e.g., magnesium treated by the process described in copending application Ser. No. 017,301) and, after distillation, prebaking the low oxygen sponge to remove absorbed water (generally the process of the aforementioned copending application Ser. No. 871,182) and ultra-slow electron beam melting the material at less than 1 (and generally less than about ¾ and preferably about 1/10-½) inch per hour and then double or triple vacuum arc melted (generally EB and vacuum arc melting as taught in copending application Ser. No. 871,183, except that the EB melting is at a much slower rate and that an alloying charge is added to the vacuum arc melting electrode). The alloying charge added during vacuum arc melting contains tin to provide 0.1-0.4 weight percent of tin in the final product (excess may be required to allow for some loss of tin during melting). The ingot of vacuum arc melted zirconium alloy can then be fabricated into the liner of reactor fuel element cladding, providing an essentially aluminum-free material (as used herein, the term "essentially aluminum-free" means having less than 5 ppm aluminum), having less than 400 ppm oxygen. More preferably, the process is controlled to provide material containing less than 300 ppm oxygen (and most preferably less than 175 ppm). In addition, the material preferably contains less than 100 ppm (and most preferably less than 50 ppm) iron. The material also preferably contains less than 10 ppm chromium and most preferably less than about 5 ppm chromium and preferably less than 10 ppm silicon. Other than iron and oxygen, the material contains less than 100 ppm total of metallic and metalloid impurities.

Thus, it can be seen that this invention produces an alloy liner (rather than a liner of unalloyed zirconium) having an extremely low metallic impurity level (especially aluminum and iron) and a very low oxygen level and provides a consistent and lower corrosion (as compared to unalloyed zirconium) liner. The liner material generally has a Brinell hardness of about 105-125 (similar to unalloyed sponge having 500-600 ppm of oxygen), thus combining fabricability, crack arresting capability and corrosion resistance. It is believed that such material, being hardened to 105-125 Brinell by tin, rather than oxygen, is less subject to irradiation embrittlement and thus gives better crack propagation resistance under irradiation.

At extremely low oxygen levels (less than about 175 ppm) somewhat higher tin levels (0.2-0.4%) are utilized to provide a hardness in the desired range. At somewhat higher (although still very low by prior standards) oxygen levels of 200-300 ppm, for example, somewhat lower tin is generally utilized to provide the desired hardness. Generally the higher tin (and thus the lower oxygen) is preferred to give improved corrosion performance.

The invention is not to be construed as limited to the particular examples described herein as these are to be regarded as illustrative, rather than restrictive. The invention is intended to cover all processes which do not depart from the spirit and the scope of the invention.

We claim:

1. A reactor fuel element liner zirconium alloy material, said material consisting essentially of:
   zirconium alloyed with 0.1-0.4 tin, said alloy containing as impurities less than 400 ppm of oxygen, less than 100 ppm of iron, and less than 100 ppm total of other metallic and metalloid impurities.

2. The reactor fuel element liner alloy material of claim 1, wherein said material contains less than 5 ppm aluminum.

3. The reactor fuel element liner alloy material of claim 1, wherein said material contains less than 10 ppm chromium.

4. The reactor fuel element liner alloy material of claim 1, wherein said material contains less than 300 ppm oxygen.

5. The reactor fuel element liner alloy material of claim 1, wherein said material contains less than 175 ppm oxygen.

6. The reactor fuel element liner alloy material of claim 1, wherein said material has a Brinell hardness of 105-125.

7. The reactor fuel element liner alloy material of claim 4, wherein said material contains 0.1-0.3 tin, and has a Brinell hardness of 105-125.

8. The reactor fuel element liner alloy material of claim 5, wherein said material contains 0.2-0.4 tin, and has a Brinell hardness of 105-125.

9. A reactor fuel element liner zirconium alloy material, said material consisting essentially of:
   electron beam melted zirconium alloyed with 0.1-0.4 tin, said alloy containing as impurities less than 400 ppm of oxygen, less than 100 ppm of iron, and less than 100 ppm total of other metallic and metalloid impurities, and having a Brinell hardness of 105-125.

* * * * *